(No Model.)
W. C. HARTMANN.
MECHANICAL MOVEMENT.
No. 265,411. Patented Oct. 3, 1882.
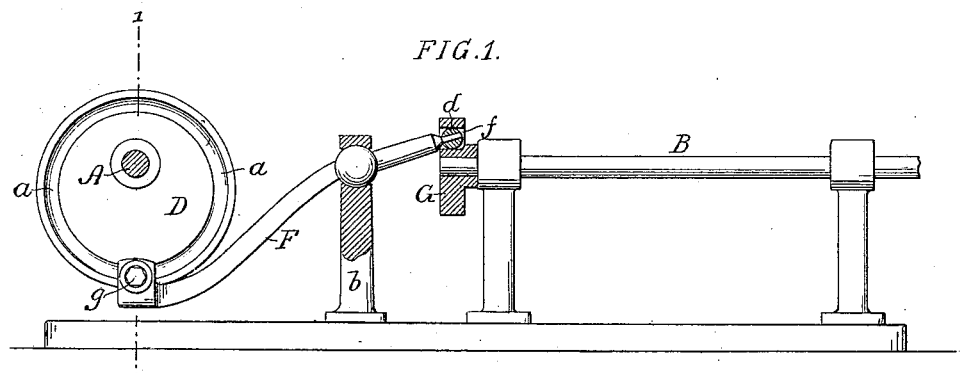
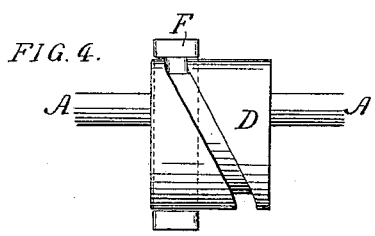
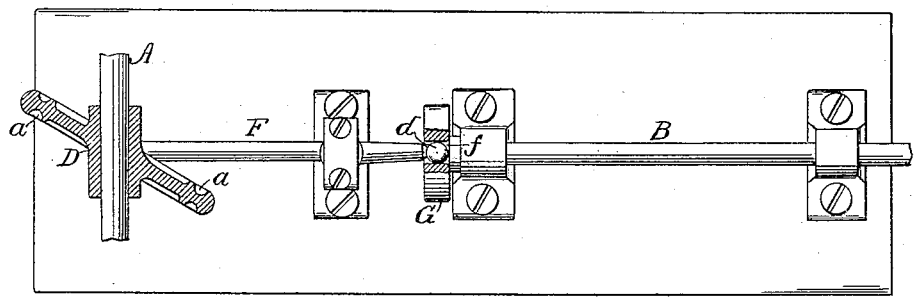
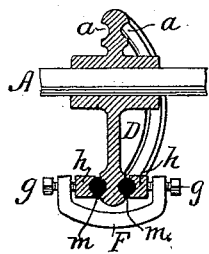
WITNESSES:
Harry Drury
James T. Tobin
INVENTOR:
W. C. Hartmann
by his attys.
Howson & Son
N. PETERS, Photo-Lithographer, Washington, D. C.

United States Patent Office.

WILLIAM C. HARTMANN, OF TOUGHKENAMON, ASSIGNOR OF ONE-HALF TO PHINEAS WILLIAM LOWNES, OF AVONDALE, PENNSYLVANIA.

MECHANICAL MOVEMENT.

SPECIFICATION forming part of Letters Patent No. 265,411, dated October 3, 1882.

Application filed August 21, 1882. (No model.)

*To all whom it may concern:*

Be it known that I, WILLIAM C. HARTMANN, a citizen of the United States, and a resident of Toughkenamon, Chester county, Pennsylvania, have invented a new Mechanical Movement, of which the following is a specification.

The object of my invention is to provide mechanism for transmitting rotary motion from one shaft to another at right angles thereto, in place of bevel-gearing, the main object of the invention being to provide a noiseless substitute for the bevel-gears, and one in which the parts can be adjusted to compensate for loss by wear.

In the accompanying drawings, Figure 1 is a side view, partly in section, of the devices comprising the movement; Fig. 2, a plan view partly in section; Fig. 3, a transverse section on the line 1 2, Fig. 1; and Fig. 4, a view showing a modification of part of the invention.

A is the driving-shaft, and B the shaft at right angles thereto, to which rotary motion has to be imparted from the shaft A. On said shaft A is an eccentric, D, which is set at an angle in respect to the shaft—that is to say, it is not at right angles thereto—and in the opposite faces of this eccentric, close to and concentric with the periphery of the same, are formed annular grooves $a$, of semicircular form, as shown in Figs. 2 and 3. A lever, F, is hung, by means of a universal joint, to a pillar, $b$, or other suitable bearing, the short arm of this lever carrying a ball, $d$, adapted to an opening, $f$, in a wheel or disk, G, on the shaft B. The long arm of the lever is forked, as shown in Fig. 3, so as to embrace the eccentric D, and each arm of the fork has a threaded opening, to which is adapted a set-screw, $g$, these set-screws acting upon socketed blocks $h$, between which and the grooves $a$ of the eccentric D are confined balls $m$. When the shaft A is rotated a combined vertical and lateral vibrating movement will be imparted to the lever F, the vertical movement being due to the eccentricity of the disk D and the lateral movement to the angle at which the eccentric is set in respect to the shaft A. The end of the short arm of the lever is thus caused to travel in a circular path concentric with the shaft B, to which, through the medium of the wheel G, a rotary motion is thus imparted, the angle of the eccentric disk D bearing such relation to the degree of eccentricity of the disk as to bring about the desired result.

In carrying out my invention it is not necessary that an inclined eccentric disk should be used in all cases for actuating the lever F. For instance, an eccentric scroll-cam such as shown in Fig. 4 may be used, if desired, and instead of hanging the lever F by a ball-and-socket joint, as shown, the lever may be hung by a horizontal pin to a standard or stud capable of turning on a vertical axis. The construction shown in the drawings is preferred, however, as it permits the ready adjustment of the parts to compensate for wear.

I claim as my invention—

1. The combination of the shaft A, having a combined cam and eccentric, D, the shaft B, having a wheel, G, and the universally-pivoted lever F, adapted to be acted upon by the device D and to actuate the wheel G, as set forth.

2. The combination of the shaft A, having an eccentric disk, D, set at an angle in respect to the shaft, as set forth, with the universally-pivoted lever F, adapted to be acted upon by said disk, all substantially as specified.

3. The combination of the shaft A and its eccentric disk D, set at an angle in respect to the shaft, and having grooves $a$, the forked lever F, the set-screws $g$, blocks $h$, and balls $m$, as set forth.

In testimony whereof I have signed my name to this specification in the presence of two subscribing witnesses.

WM. C. HARTMANN.

Witnesses:
HARRY DRURY,
HARRY SMITH.